(12) United States Patent
Hong

(10) Patent No.: US 6,885,373 B1
(45) Date of Patent: Apr. 26, 2005

(54) SYSTEM AND METHOD FOR DISTRIBUTING DRAWINGS THAT ILLUSTRATE ANIMATION

(76) Inventor: Sung Woo Hong, 5465 White Oak Ave., #119, Encino, CA (US) 91316

( * ) Notice: Subject to any disclaimer, the term of this patent is extended or adjusted under 35 U.S.C. 154(b) by 193 days.

(21) Appl. No.: 10/024,577

(22) Filed: Dec. 18, 2001

Related U.S. Application Data

(60) Provisional application No. 60/260,292, filed on Jan. 8, 2001.

(51) Int. Cl.[7] .............................................. G06T 13/00
(52) U.S. Cl. ........................ 345/473; 345/418; 705/26; 705/27
(58) Field of Search ................................ 345/418, 473, 345/962; 705/26, 27

(56) References Cited

U.S. PATENT DOCUMENTS

2003/0105678 A1 * 6/2003 Bratton .......................... 705/26
2003/0216971 A1 * 11/2003 Sick et al. ..................... 705/26

* cited by examiner

*Primary Examiner*—Kimbinh T. Nguyen
(74) *Attorney, Agent, or Firm*—John J. Connors; Connors & Assoc. Inc.

(57) ABSTRACT

Disclosed is a system for distributing drawings that illustrate animation. This system includes a global computer communication network, and a web site connected to this network that is adapted to display on a monitor screen a unique ordering display. The display enables a buyer (a) to select at least one subject from a plurality of different subjects for the drawings, (b) to select a time interval at which individual drawings are delivered to the buyer, (c) to select a payment method, and (d) to provide a mailing address to which the drawings are sent.

5 Claims, 23 Drawing Sheets

Fig. 3C

Animation Membership Card

NUMBER OF DRAWINGS IN SERIES

☐ 46    1 drawing, 1 Background PRICE $30

☐ 47    4 drawings, 2 Backgrounds PRICE $120

☐ 48    16 drawings, 3 Backgrounds PRICE $300

☐ 49    24 drawings, 4 Backgrounds PRICE $400

BUYER'S NAME   ☐☐☐☐☐☐☐☐☐☐☐ 38
ADDRESS   ☐☐☐☐☐☐☐☐☐☐☐☐ 40
PHONE NUMBER   ☐☐☐☐☐☐☐☐☐☐ 42

CREDIT CARD    NUMBER
☐ AMEX   ☐☐☐☐☐☐☐☐☐☐ 44c
☐ DISCOVERY   ☐☐☐☐☐☐☐☐☐☐ 44d
44a
44b

DELIVERY SCHEDULE
☐ 1 Drawing every week
☐ 1 Drewing every other week
☐ 1 Drewing every third week (5% discount)
50
51
52

54
[SEND]
30

Page 4

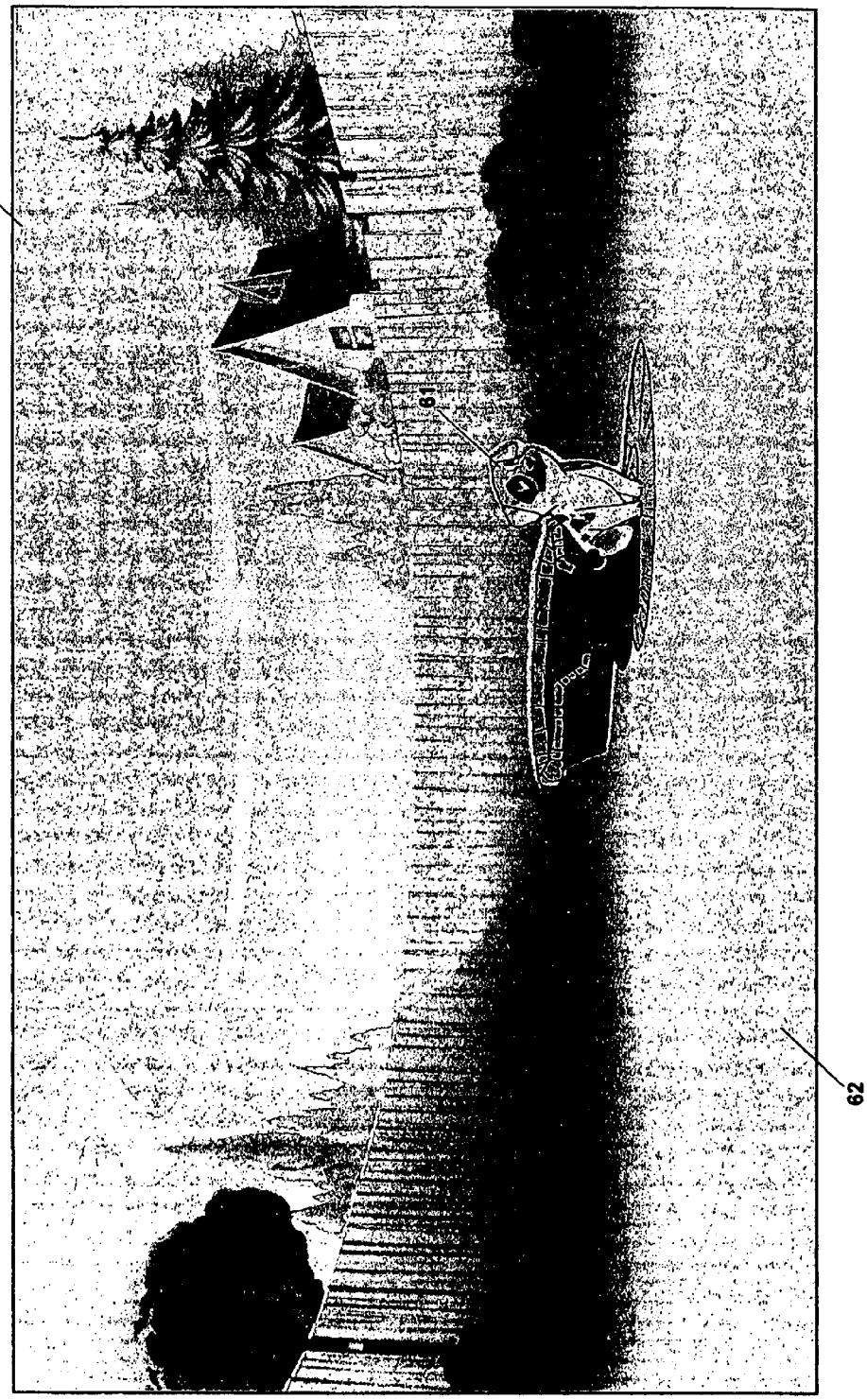

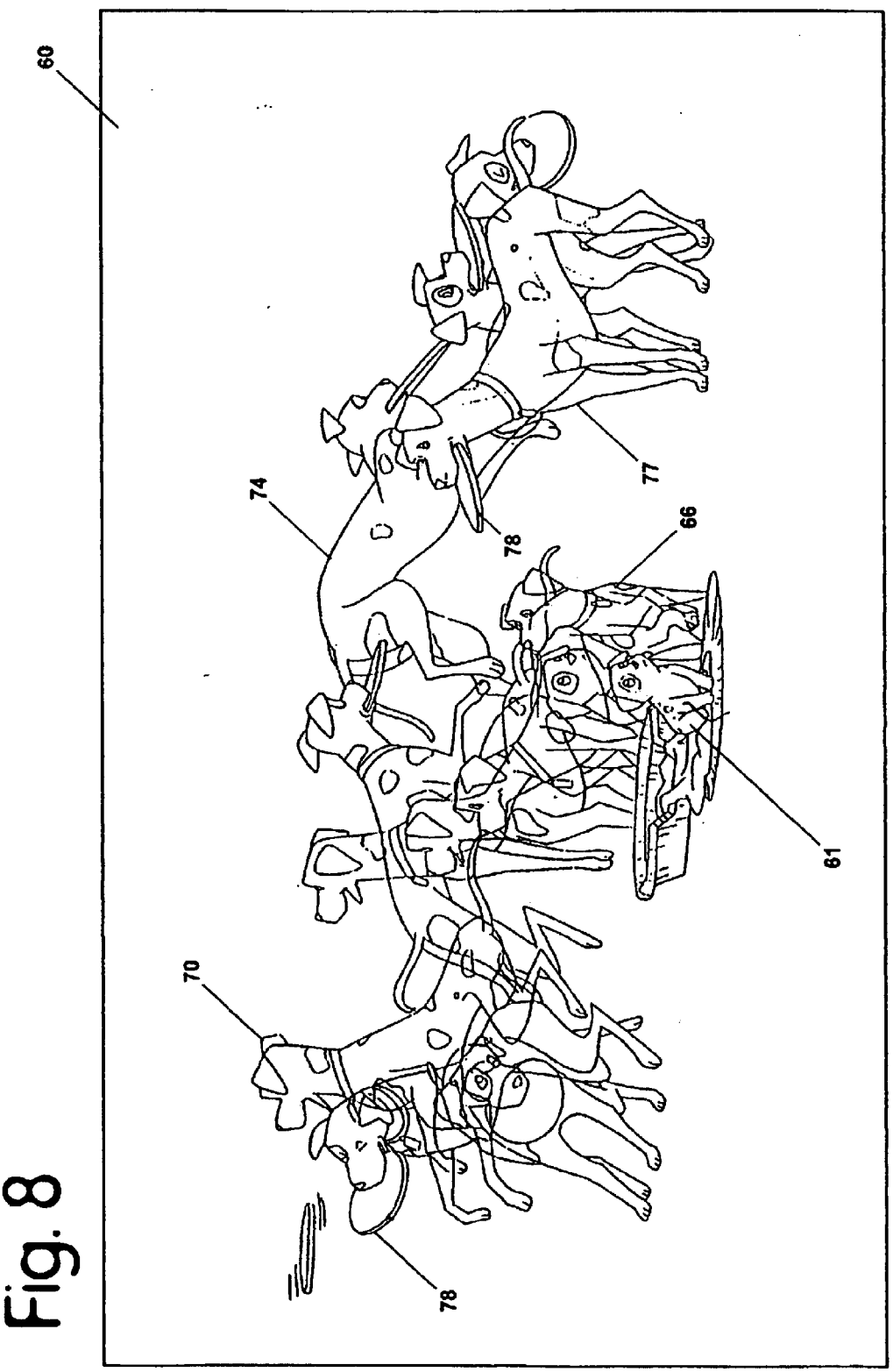

SYSTEM AND METHOD FOR DISTRIBUTING DRAWINGS THAT ILLUSTRATE ANIMATION

This application is a utility application based on U.S. provisional patent application Ser. No. 60/260,292 entitled "System and Method For Distributing Drawings That Illustrate Animation," filed Jan. 8, 2001. This related application is incorporated herein by reference and made a part of this application.

BACKGROUND OF THE INVENTION

In the creation of animated productions such as movies, a line sketch of a subject, such as, for example, a cartoon character, is made on a transparent, plastic film and the backside of the film is painted to color the character. Several different, separate individual films are employed with the character changing posture or position from one film to the next. Individually painted films are placed over a sheet displaying a background scene for the character. Typically, the background scene is printed and remains the same for a number of different postures or positions of the character. The character may be, for example, a cartoon of a human being, an animal such as a dog or a cat, plants such as fruits, vegetables, flowers, or other types of vegetation, or even mechanical or structural objects such as automobiles and buildings. Virtually anything may be the subject of animation art.

In making an animated movie, each assembled film and background sheet constitutes a different frame of the movie. The individual films are assembled one by one on individual sheets bearing the identical printed background scene to produce a series of individual drawing showing the character in the context of a selected background. It may be desirable to change the background as the position of the character changes. These individual drawings are arranged in a predetermined sequence that represent the character moving in a step-wise fashion frame by frame from one posture or position to another posture or position. Thus, when one rapidly flips through the drawings arranged in the correct sequence, one sees the character continuously moving rather than as a series of individual frames. With the advent of computers, much of this artwork is now produced by computers rather than hand drawing and hand painting. Nevertheless, such hand-painted art is in many ways more desirable than art created by computers. Such a hand-painted transparent film mounted on a support sheet having a printed background picture thereon is a beautiful work of art suitable for framing and displaying in one's home or office.

It would be advantageous, from an instructional point of view, to provide a series of such hand-painted works of art in a cost-effective way, particularly to children who could then be taught how cartoon characters are animated in movies.

SUMMARY OF THE INVENTION

It is the objective of this invention to provide a system and method that facilitates the delivery of drawings that illustrate animation.

This invention has several features, no single one of which is solely responsible for its desirable attributes. Without limiting the scope of this invention as expressed by the claims that follow, its more prominent features will now be discussed briefly. After considering this discussion, and particularly after reading the section entitled, "DETAILED DESCRIPTION OF THE PREFERRED EMBODIMENTS," one will understand how the features of this invention provide its benefits, which include, but are not limited to, delivery, over a period of time a series of hand-painted drawings that illustrate animation, providing low cost original hand-painted animation art, and facilitating ordering individual, original hand-painted animation drawings of a wide variety of subjects selected by the buyer.

The first feature of the system for distributing drawings that illustrate animation is that it includes a global computer 11 communication network (The Internet) and a web site connected to said network. The pages of the web site are displayed on the monitor screen of the buyer's computer when the buyer connects to the web site. This page display enables the buyer (a) to select at least one subject from a plurality of different subjects for the drawings, (b) to select a payment source, and (d) to provide a mailing address to which the drawings are sent. Optionally, the display enables the buyer to select a time interval at which individual drawings are delivered to the buyer. Each individual drawing is only one of a series of drawing used in making an animated movie.

The second feature is that the web site includes an animated movie illustrating the type of drawings being offered. This movie shows a sample of the type of art work being provided, preferably in color, and comprising a series of individual frames that give the illusion to the buyer looking at the movie that the subject is actually moving. The drawings comprises a series of individual drawings of the subject in a predetermined sequence where, from one individual drawing to the next in the sequence, the subject changes in size or position so that, when the series of individual drawings are viewed rapidly one after the other in said sequence, the subject appears to change shaped or move in an animated manner. The movie may or may not be identical to the subject of the drawing being ordered by the buyer.

The third feature is that at least one drawing, and preferably all, are original hand-painted works of art on a transparent film. An important aspect of this invention is that at least one drawing includes on a single transparent film the subject appearing as a series of line sketches corresponding to the size or position of the subject shown in the individual drawings. Preferably, this one drawing (referred to herein as a multiple position drawing) preferably has the first and last sketch in the sequence hand-painted. Such a multiple position drawing clearly illustrates how the different sketches are arranged when making an animated movie to create the illusion that the subject is alive and capable of action. In one embodiment of this invention, the subject of a multiple position drawing grows from an infant to an adult and moves into different positions during this growth process.

The fourth feature is that the drawing comprises an assembly of the transparent film placed to overlie a printed background scene. Typically, the printed background scene is in color. Preferably, each individual drawing is delivered in a folder holding the individual drawing. At least one folder preferably provides information about the selected subject, such as, for example, a fictitious Birth Certificate. Optionally, the buyer is provided a card indicating membership in a club promoting animation art.

This invention also includes a method of distributing drawings that illustrate animation. This method comprises:
  providing a web site connected to a global computer communication network,
  the web site displaying on a monitor screen a display for enabling a buyer (a) to select at least one subject from a plurality of different subjects for the drawings, the drawings comprising a series of individual drawings of the subject in a predetermined sequence where, from one individual drawing to the next in the sequence, the subject changes in size or position so that, when the series of individual drawings are viewed rapidly one after the other in said sequence, the subject appears to change shaped or move in an animated manner, (b) to select a payment source, and (c) to provide a mailing address to which the drawings are sent, and connecting to the web site and ordering a series of drawings by selecting the subject of the drawings and the source of payment, and by providing a mailing address to which the individual drawings are sent. Preferably, the display enables the buyer to select a time interval at which individual drawings are delivered to the buyer, and the web site includes an animated movie illustrating the type of drawings being offered.

DESCRIPTION OF THE DRAWING

The preferred embodiments of this invention, illustrating all its features, will now be discussed in detail. These embodiments depict the novel and non-obvious systems and methods of this invention for distributing drawings that illustrate animation as shown in the accompanying patent drawing, which is for illustrative purposes only. This patent drawing includes the following figures (FIGS.), with like numerals indicating like parts:

FIG. 3C is page 4 of the website depicted in FIG. 1.

FIG. 6B illustrates the assembly of a transparent film bearing the hand-painted animation art overlying the background picture shown in FIG. 6A.

FIG. 7N shows the same dog standing sideways and looking to the left with the Frisbee in its mouth.

FIG. 8 shows a transparent film with the individual line drawings or hand sketches of the dog shown in FIGS. 7A through 7N superimposed on each other, but spaced apart.

DETAILED DESCRIPTION OF THE PREFERRED EMBODIMENTS

Figure 1:
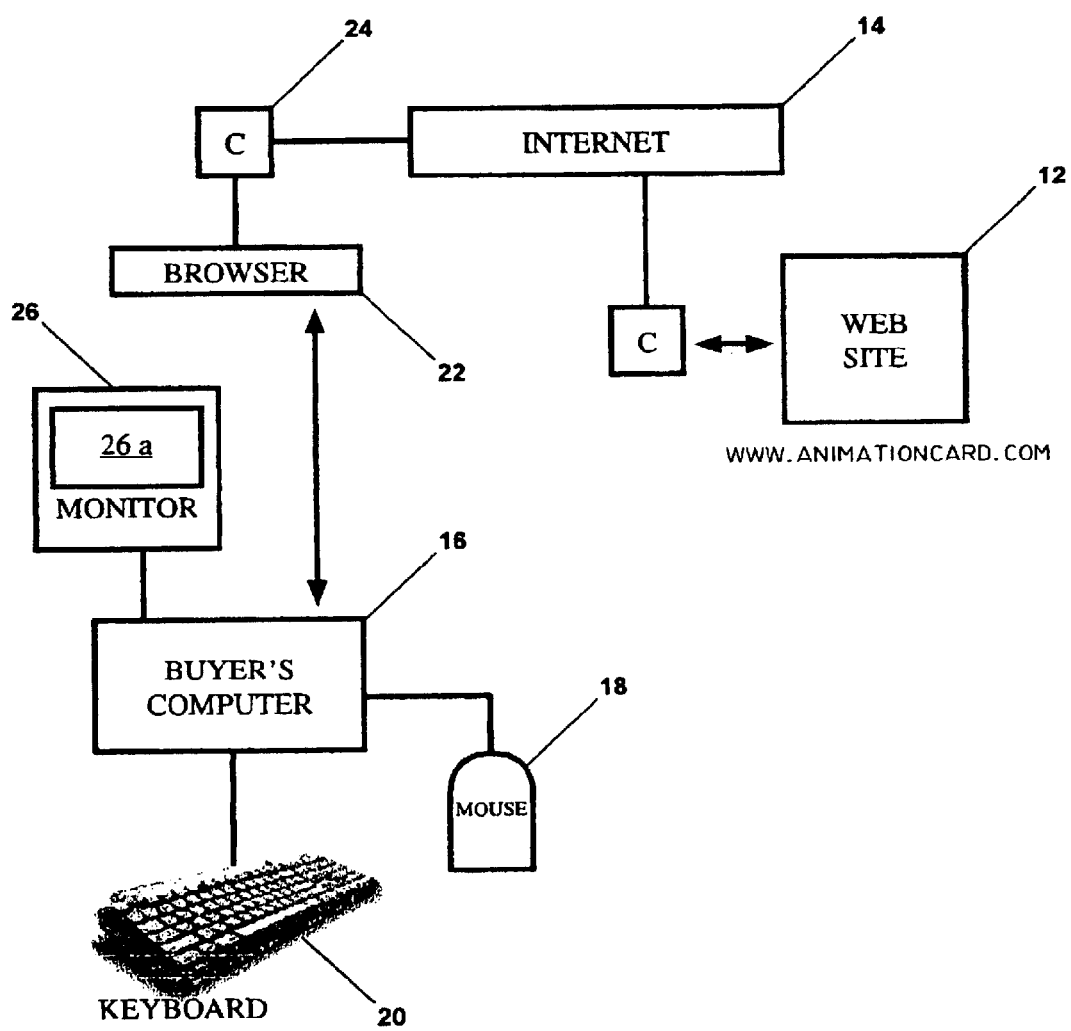
FIG. 1 is a schematic diagram illustrating a buyer's computer connected to a seller's website that offers hand painted animation art for sale.

As depicted in FIG. 1, the system 10 of this invention for distributing drawings that illustrate animation includes a seller's website 12 connected to a global computer communication network 14 commonly referred to as the World Wide Web or Internet. A buyer of such drawings would order the drawings via the Internet. The buyer's computer 16 would typically include a mouse 18 and a keyboard 20 and be connected by a browser 22 and connector 24 for the Internet to the Internet. The buyer's computer 16 includes a monitor 26 having a screen 26a on which is displayed the various pages of the website 12 when the buyer accesses the website. For example, the website domain name could be www.animationcard.com.

Figure 2:
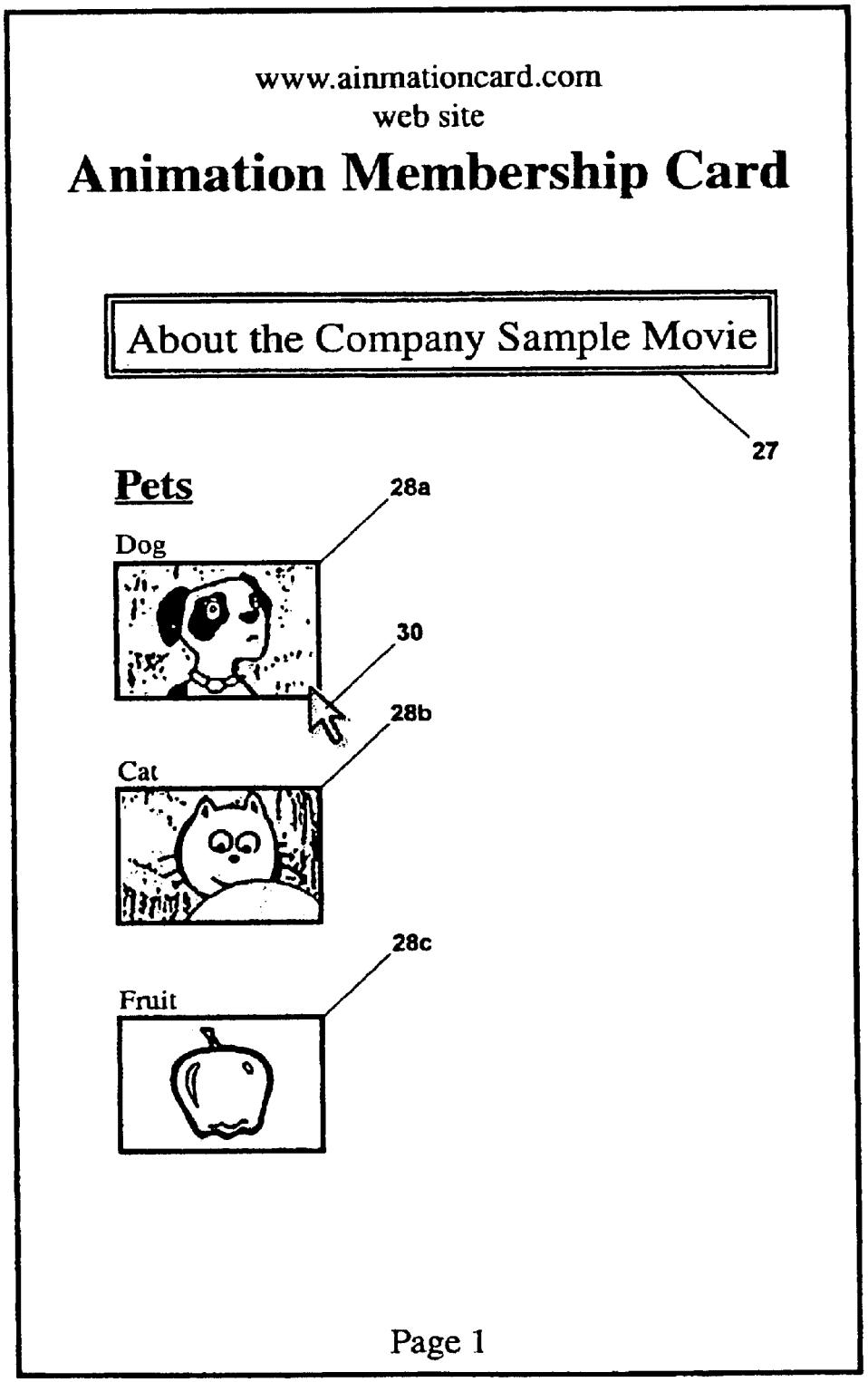
FIG. 2 is page 1 of the seller's website depicted in FIG. 1.
Figure 3A:
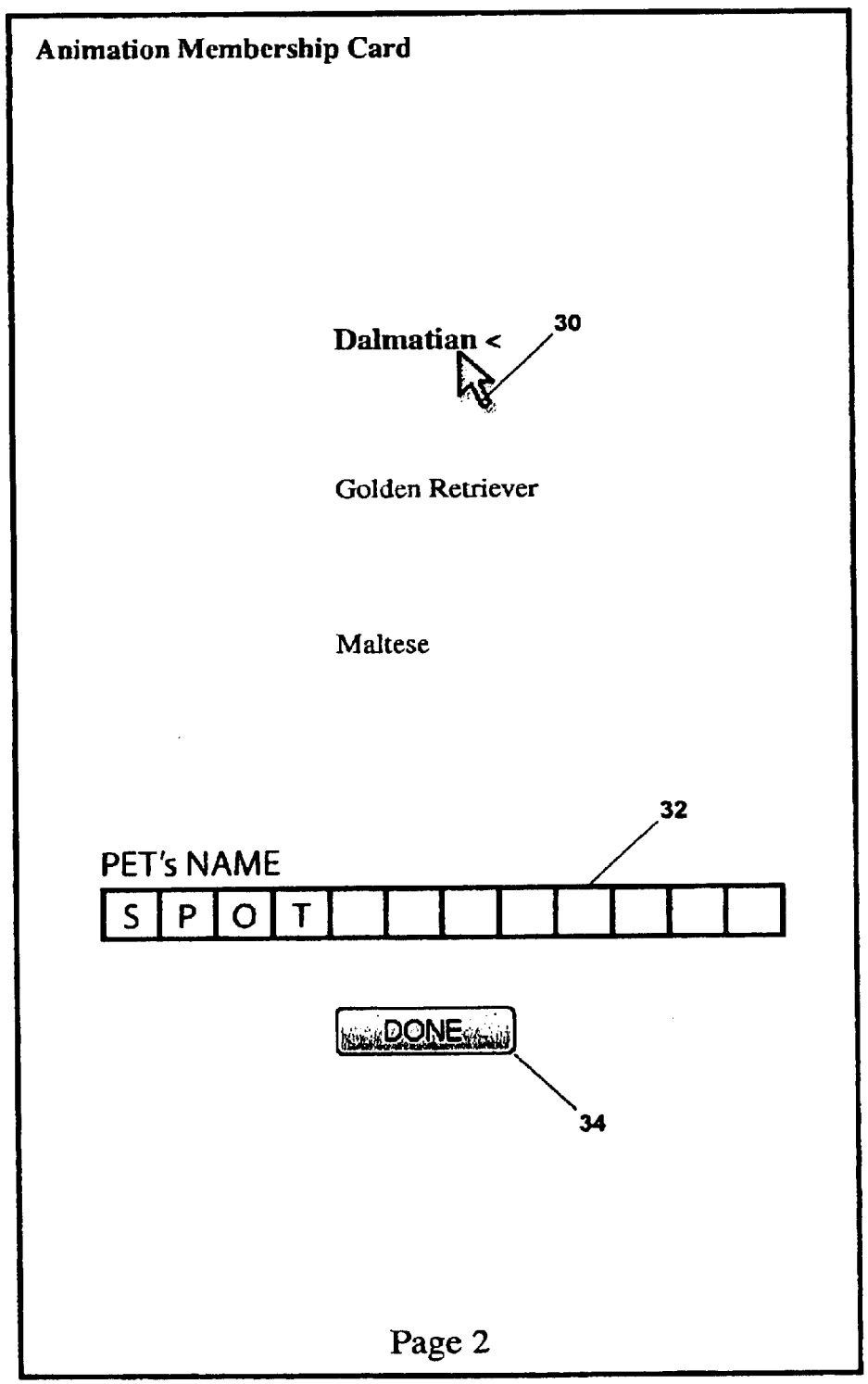
FIG. 3A is page 2 of the website depicted in FIG. 1.
Figure 3B:
FIG. 3B is page 3 of the website depicted in FIG. 1, showing a fictitious Birth Certificate containing information about the subject selected by the buyer for a series of animation art works, such as, for example, the dog depicted in the series of transparent films illustrated in FIGS. 7A–7N.

When the buyer connects to the website 12 there is displayed page 1 (FIG. 2) of the web site, which includes a series of icons 28a, 28b, 28c depicting different subjects of drawings that may be ordered by the buyer: For example, pets such as dogs (icon 28a) and cats (icon 28b), or plants (icon 28c), for example, a fruit such as an apple. There also is a button 27 that the buyer may point and click on using the mouse 18 to access information about the seller and the services and products being offered for sale, including a sample animated movie showing the quality of the art work provided in the drawings that will be delivered to the buyer. The sample animated movie may or may not include the subject of the drawings that the buyer orders over the web site 12. Using the mouse 18, the buyer selects the subject of the drawing he or she will purchase by pointing an arrow 30 appearing on the monitor screen 26a on the icon corresponding to the selected subject and clicking the mouse. For example, as soon as the buyer clicks on the icon 28a of the dog, page 2 (FIG. 3A) of the web site 12 appears on the screen 26a of the buyer's monitor 26. Page 2 allows the buyer to select a particular breed of dog and give the dog a name. For example, by pointing the arrow 30 on the word "Dalmatian" and clicking, the subject of the drawing will be a Dalmatian dog. Using the keyboard 20, the buyer then types in the name of his or her "imaginary" pet dog, for example, Spot, in the field 32 appearing on page 2 and designated as "Pet's Name." A "done" icon button 34 is next clicked using the mouse 18 to advance to the next page of the web site 12, namely, page 3 (FIG. 3B). Page 3 comprises a statement discussing the breed, in this case the Dalmatian breed, and providing a fictitious Birth Certificate. For example, the birth date appearing on the Birth Certificate may be the date the order was placed; for example, Nov. 21, 2000. The Birth Certificate may also include instructions on how the buyer would care for his or her "imaginary" pet. This Birth Certificate, preferably including the buyer's name as the owner, for example, Tom Smith, may also serve as a membership card enabling the buyer to receive certain benefits such as special discounted offers on other drawings.

Using the mouse 18, the buyer would next point the arrow 30 on the "done" button 36 and click to advance to page 4 (FIG. 3C) of the web site 12 which appears on the screen 26a of the monitor 26. This page 4 contains a field 38 that allow the buyer to enter using the keyboard 20 his or her name, a field 40 for the buyer's address, a field 42 for the buyer's phone number, and boxes 44a and 44b to click on to select the payment source, for example, the buyer's credit card type for example, American Express or Discover and the fields 44c and 44d respectively for the credit card number of the selected credit card type. The buyer would then select the delivery schedule for the number of drawings that he or she selected by clicking on one of the four boxes 46 through 49 at the top of page 4, indicating how many drawings; in this example, from 1–24 in the series. The buyer may also selected a desired delivery schedule by clicking one of the boxes 50 through 52 on the bottom of page 4. For example, by checking box 50 one drawing every week will be delivered; by checking box 51 one drawing every other week will be delivered; and by checking box 52 one drawing every third week will be delivered. In the last case, a discount could be given, for example, a five percent (5%) discount. When this information is completed, the buyer would, using the mouse 18, point the arrow 30 on a send button 54 and click to order the selected drawings. The web site 12 preferably includes verification software that prevents sending the order unless the information on page 4 was properly completed.

Figure 4:
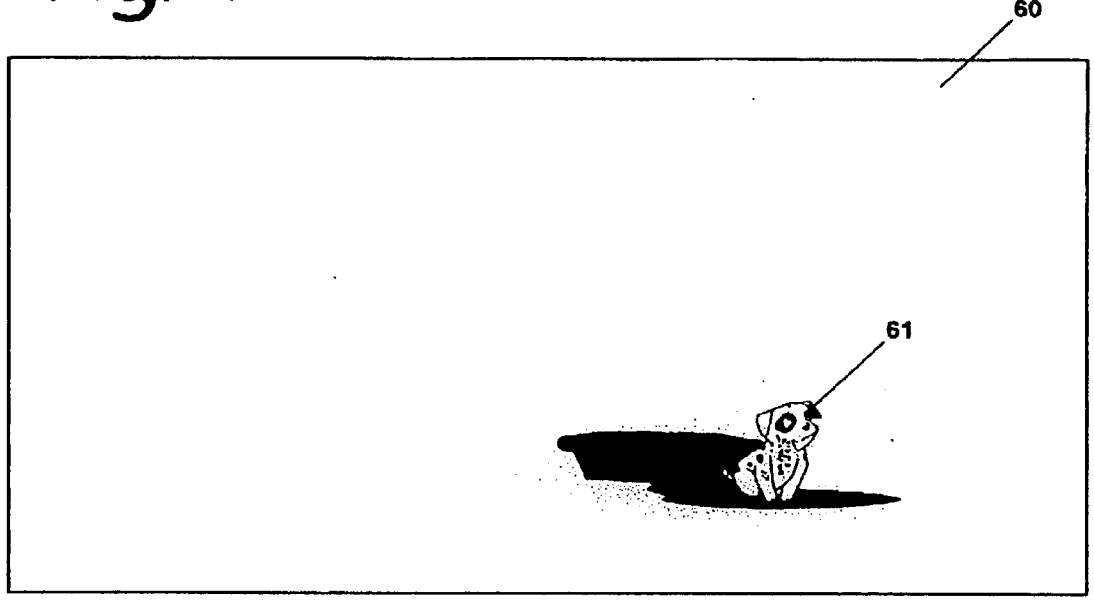
FIG. 4 is the front side of a transparent film displaying a hand-drawn and hand-painted subject, specifically a cartoon of a Dalmatian puppy.
Figure 5:
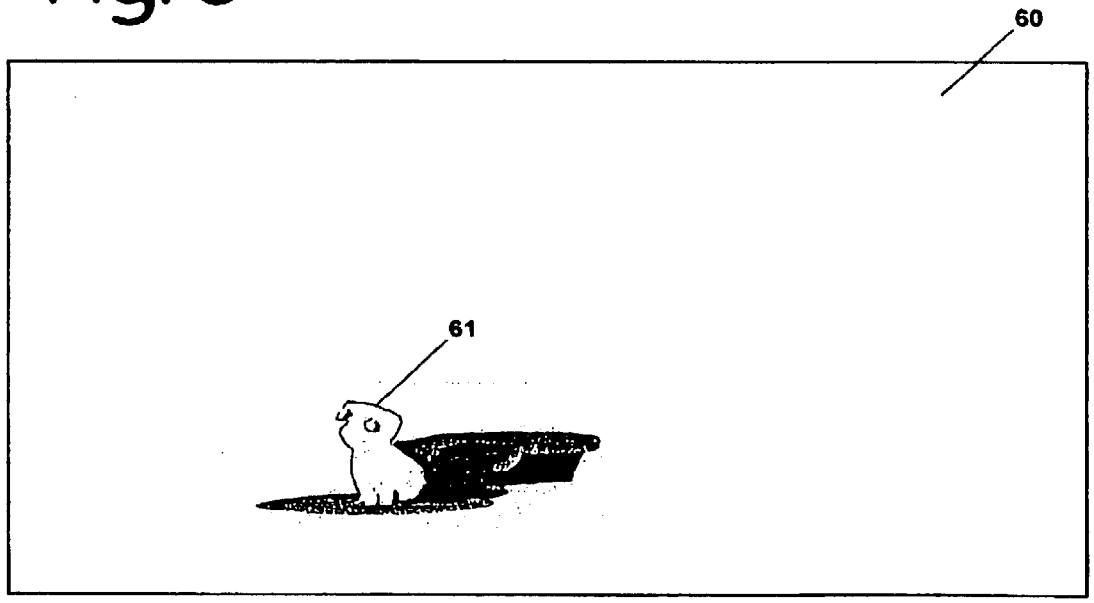
FIG. 5 is the backside of the transparent film shown in FIG. 4 showing how the line drawing of the puppy is painted from the backside.
Figure 6A:
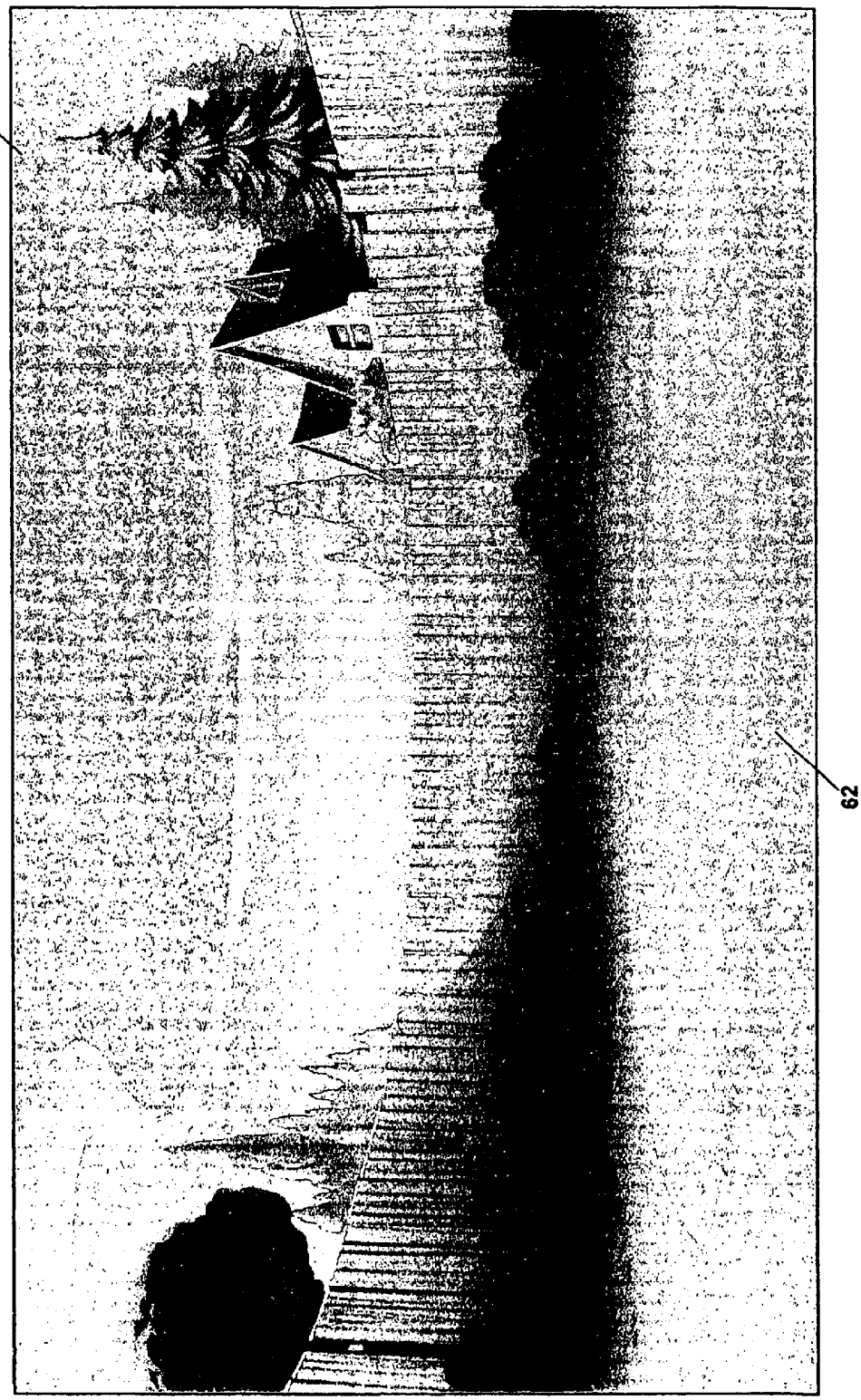
FIG. 6A illustrates one printed, colored background picture used with transparent films bearing the hand-painted animation art.

The drawing to be delivered to the buyer comprises (1) a transparent film 60 (FIGS. 4 and 5) bearing a multicolored, hand-painting 61 of the selected subject in one position of a series of positions, and (2) a multicolored printed background sheet 62 such as shown in FIG. 6A. As illustrated in FIG. 6B, the drawing comprises an assembly of the hand-painted transparent film 60 overlying the multicolored printed background 62. In accordance with conventional practice, first a hand-drawn line sketch is made, for example of the sketch 64 shown in FIG. 7A, on the transparent film 60. From this single hand-drawn line sketch 64, an unlimited number of reproductions may be made on individual transparent films. The backside of each reproduction is painted one color at a time using the lines of the sketch as a guide. This hand-painted transparent film 60 is then placed over the printed background sheet 62 as illustrated in FIG. 6B.

Figure 7A:
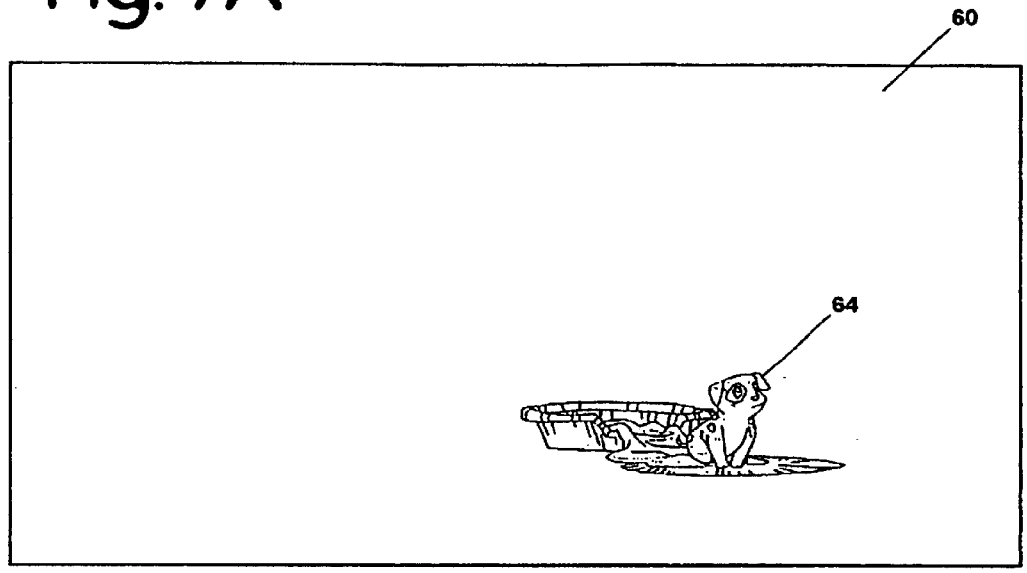
FIGS. 7A through 7N depict individual transparent films on which are drawn on different individual films of the same subject growing and moving into different positions, with FIG. 7A showing the subject, a Dalmatian dog as a puppy, seated in front of its bed.
Figure 7B:
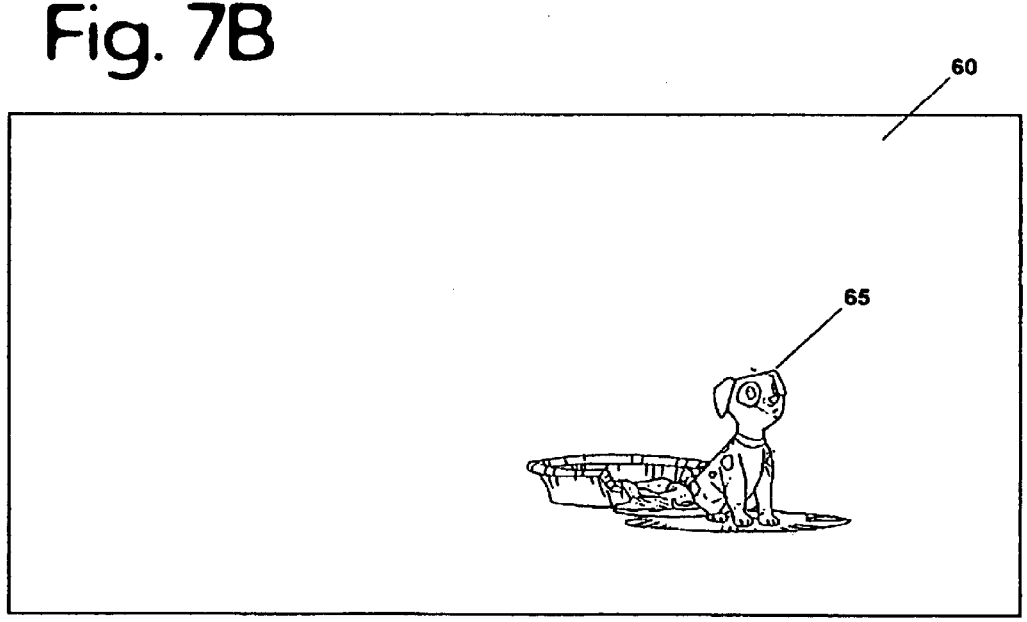
FIG. 7B shows the same puppy, a little larger, with a slightly different facial expression sitting before its bed.
Figure 7C:
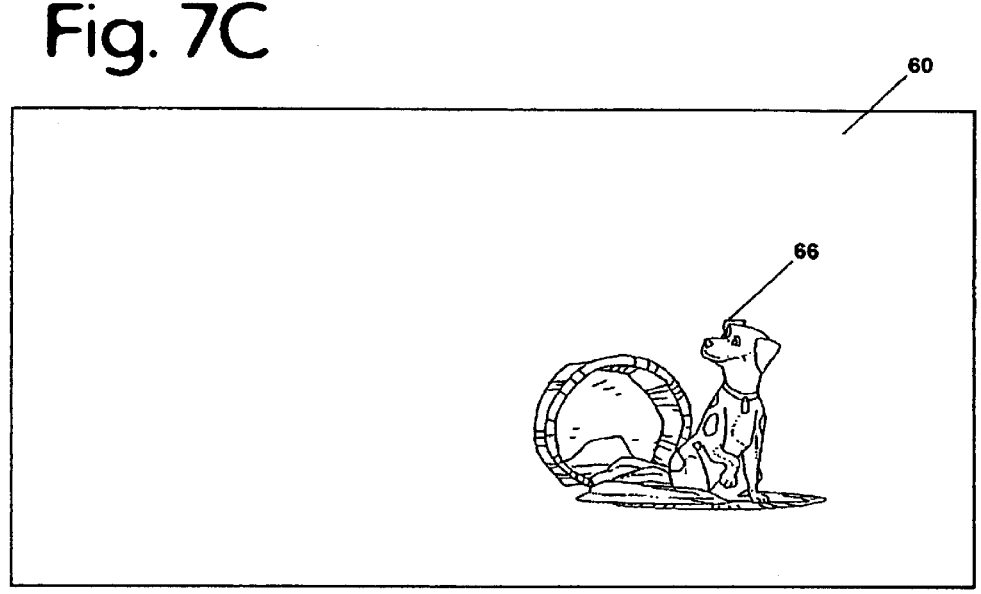
FIG. 7C shows the same puppy now grown into a full size dog sitting before its bed which has now been tilted into a vertical position.
Figure 7D:
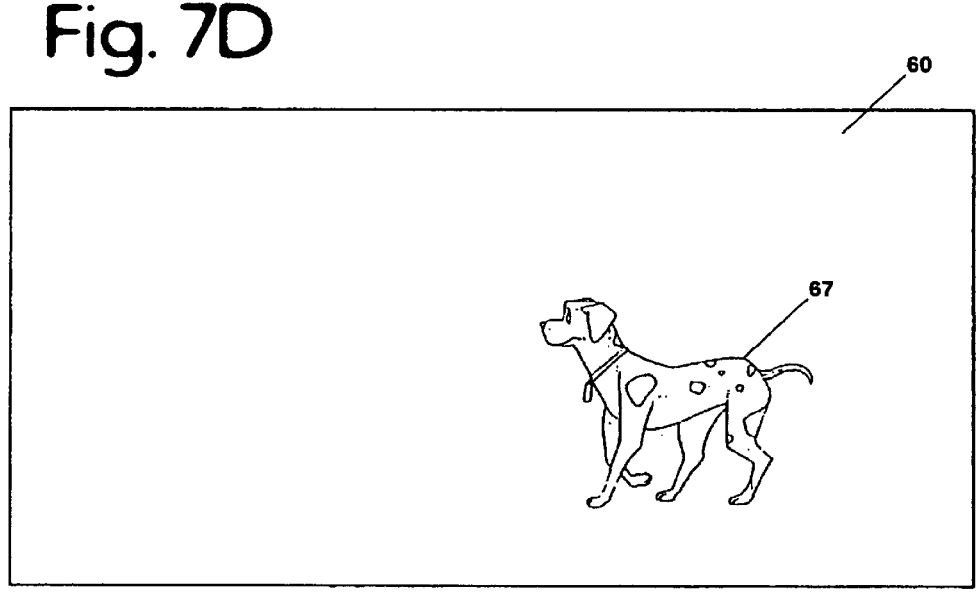
FIG. 7D shows the same dog turning to the left as shown in FIG. 7D and beginning to walk.
Figure 7E:
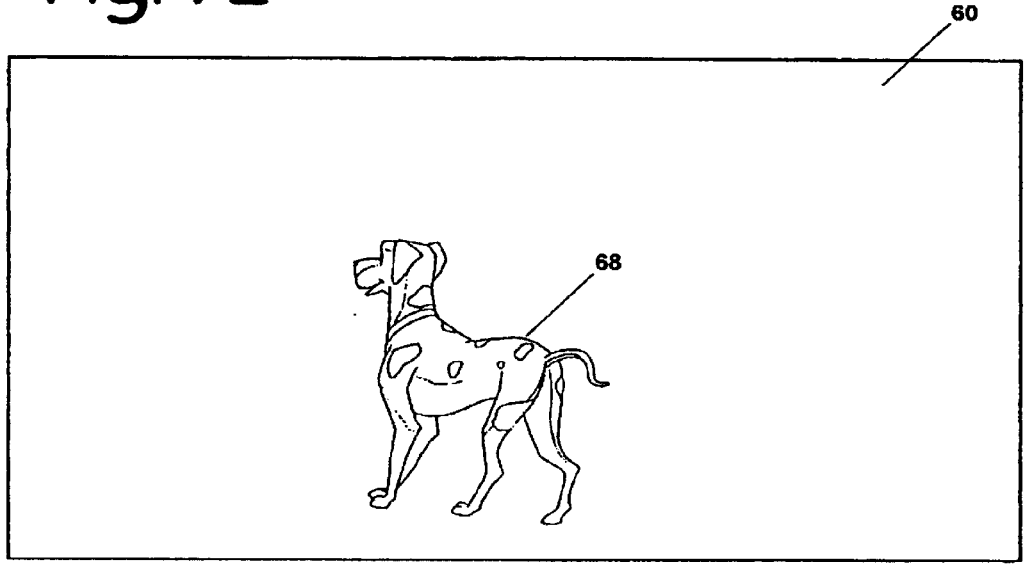
FIG. 7E shows the same dog facing away from the viewer looking to the left.
Figure 7F:
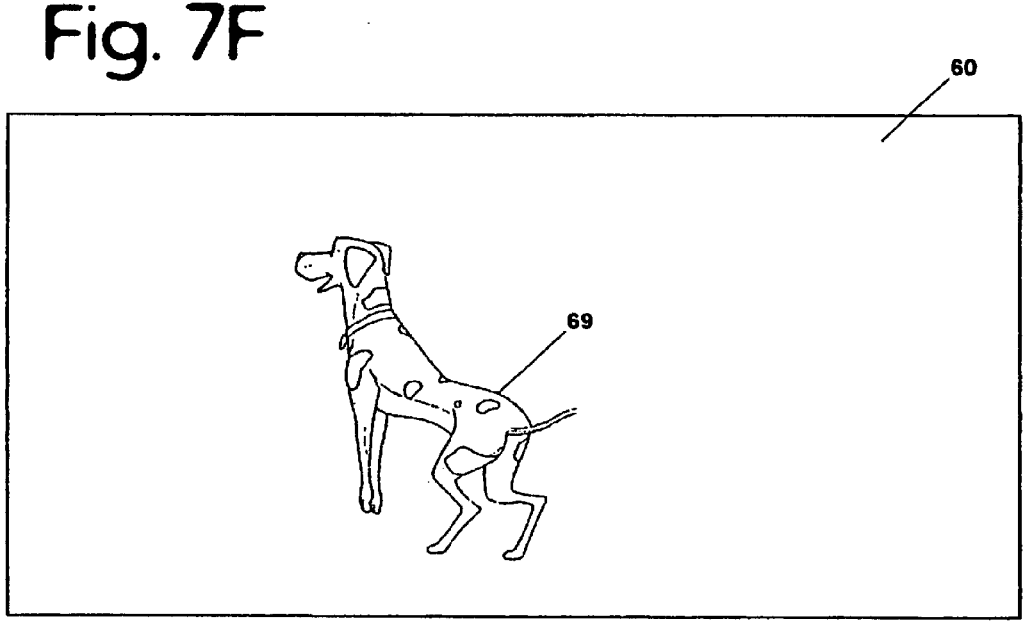
FIG. 7F shows the same dog in a similar position shown in FIG. 7E but raised up on its front legs and with its rear crouched slightly in a ready to jump position.
Figure 7G:
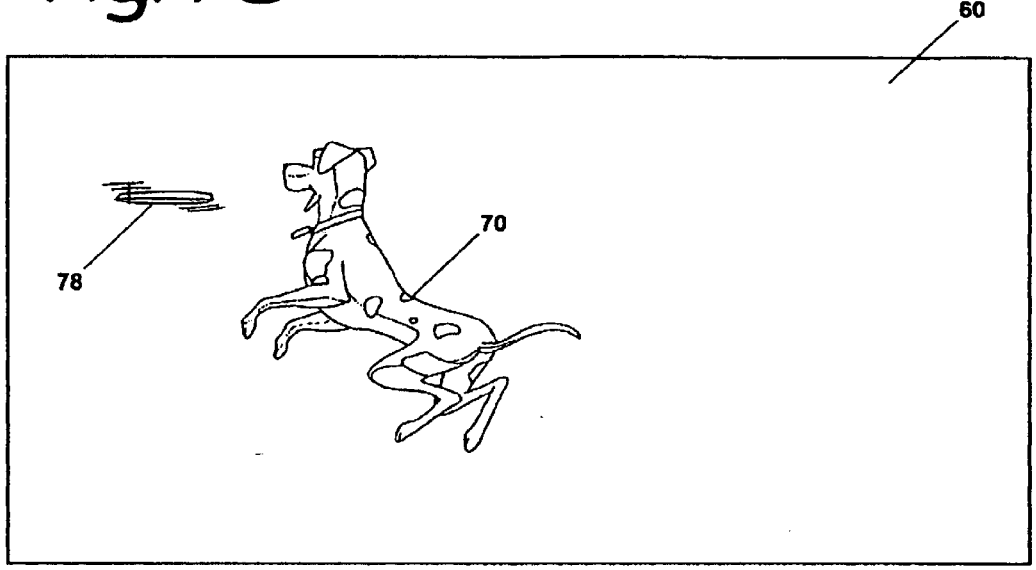
FIG. 7G shows the same dog jumping to catch a Frisbee in mid-air.
Figure 7H:
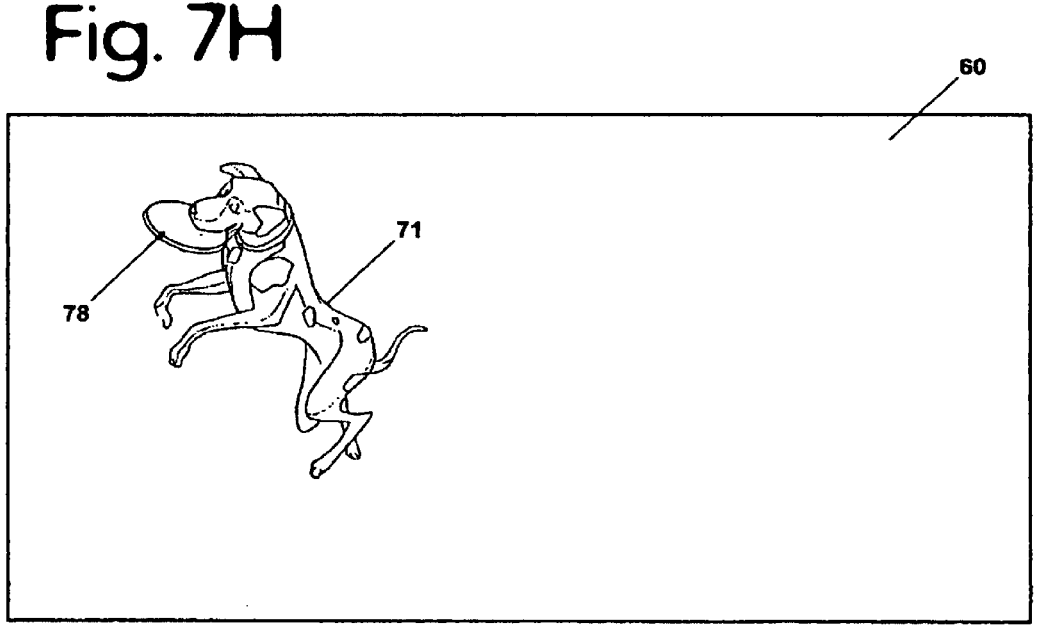
FIG. 7H shows the same dog catching the Frisbee in its mouth and turning towards the viewer.
Figure 7I:
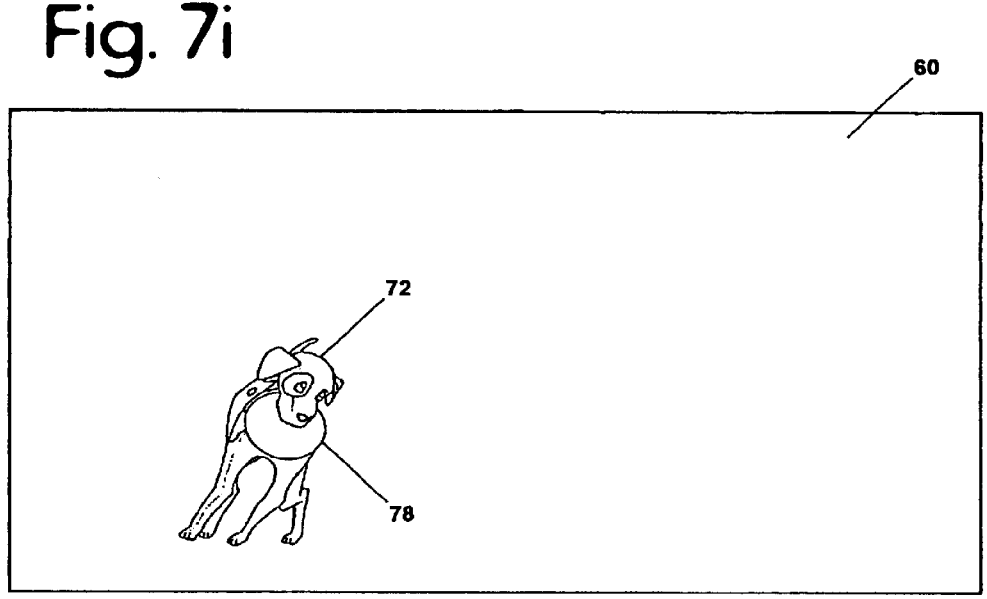
FIG. 7I shows the same dog landing on the ground fully facing the viewer with the Frisbee in its mouth.
Figure 7J:
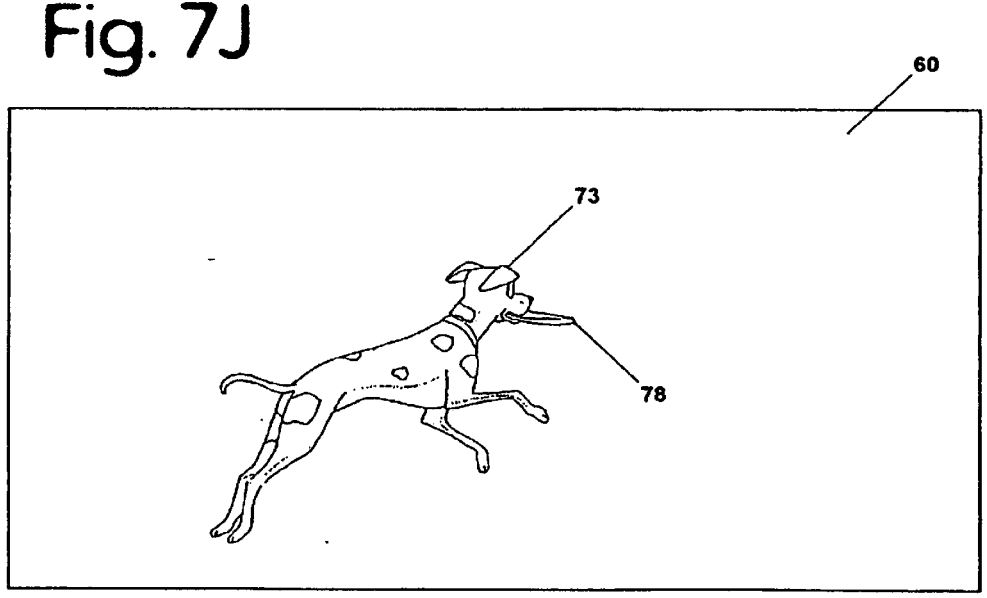
FIG. 7J shows the same dog turned to the right and facing away from the viewer and jumping up with the Frisbee in its mouth.
Figure 7K:
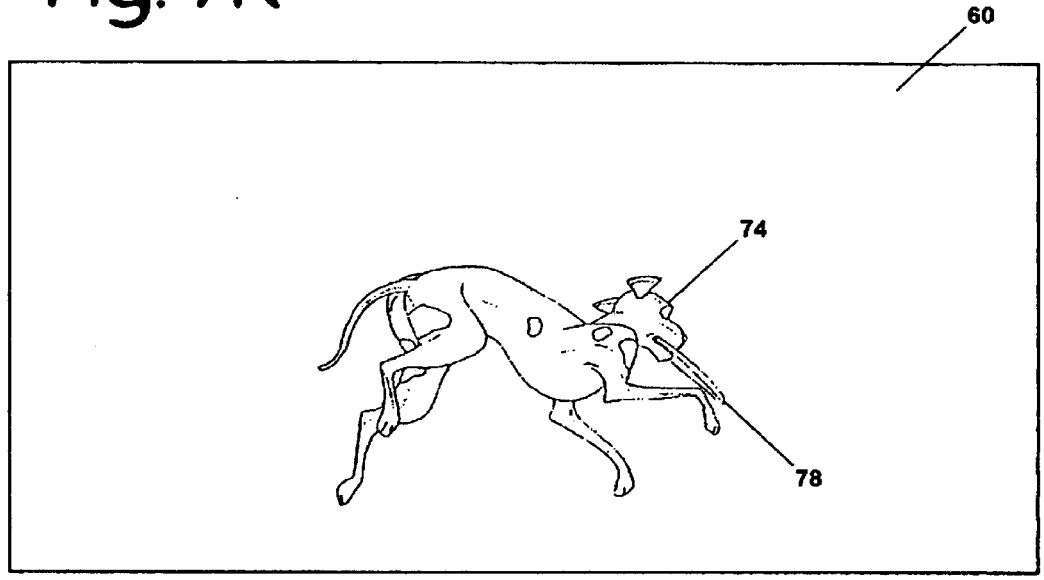
FIG. 7K shows the same dog with the Frisbee in its mouth in mid-air and beginning to turn towards the viewer.
Figure 7L:
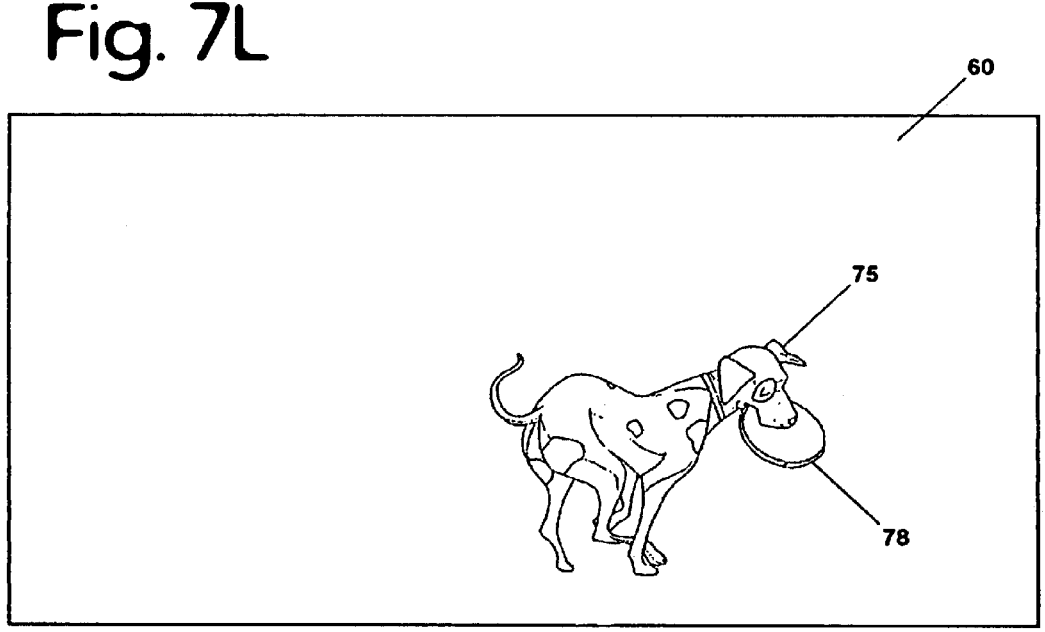
FIG. 7L shows the same dog landing with its head turned towards the viewer and the Frisbee in its mouth.
Figure 7M:
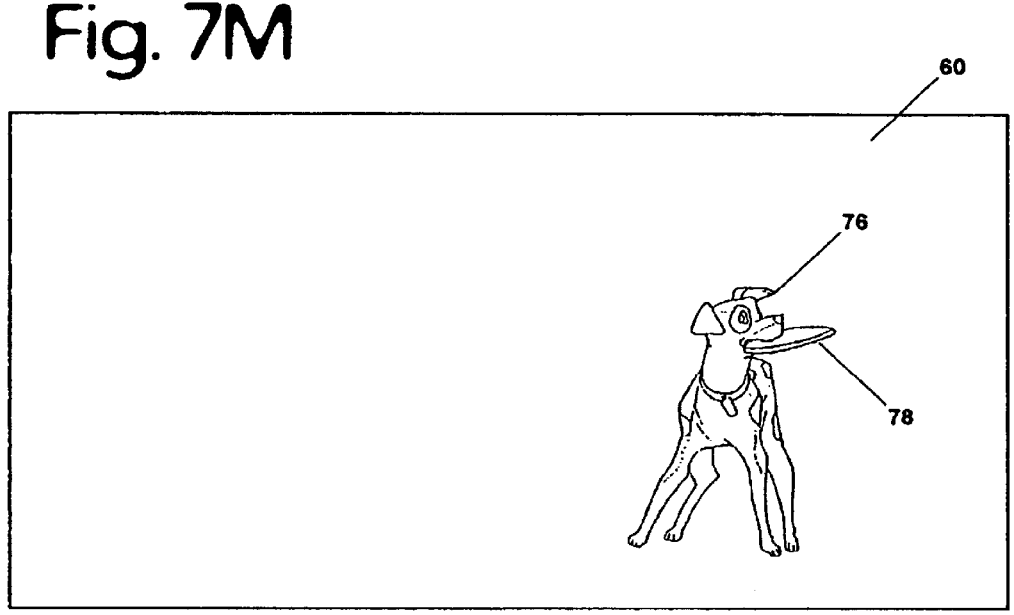
FIG. 7M shows the same dog fully facing the viewer with its head turned toward the right with the Frisbee in its mouth.
Figure 7N:
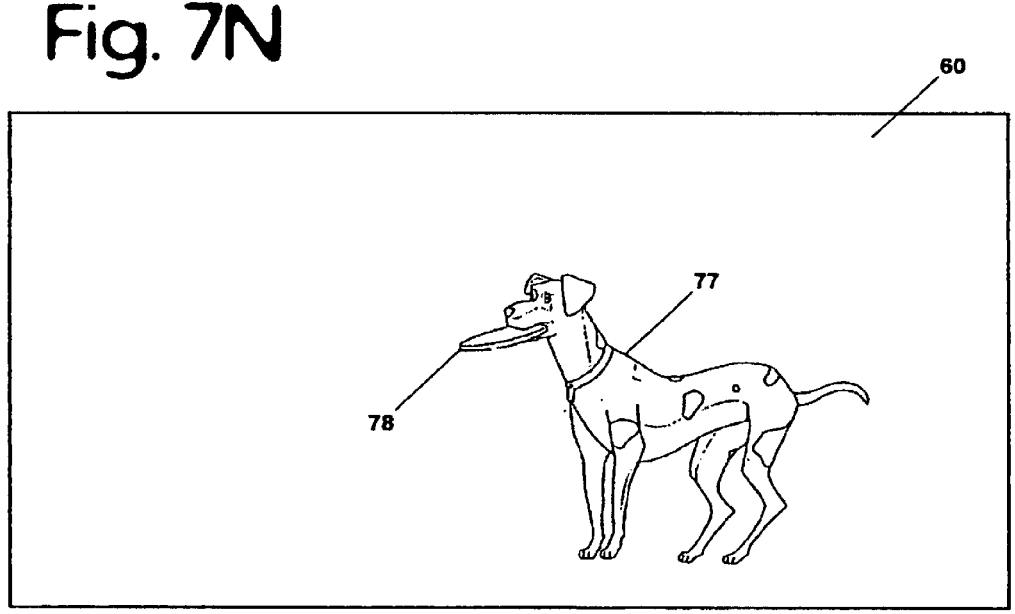

Assuming that the buyer ordered a series of fourteen drawings by checking box 48 on page 4 of the web site 12, then the subject, a Dalmatian dog, is drawn in different postures or positions designated as sketches 64 through 77 on fourteen different transparent films 60 respectively shown in FIGS. 7A through 7N. Each sketch 64 through 77 is hand-drawn and then reproductions are made therefrom. The sketches 64 through 77 are in a predetermined sequence with the subject Dalmatian dog in different postures or positions. Specifically, the sketches 64 through 77 are in a sequence that shows the dog as it grows from a puppy to a full grown dog, and moves from its bed to turn away from the viewer, jump into the air to catch a Frisbee 78, turn around toward the viewer, and assume a standing position with the Frisbee in it's mouth. Each sketch is hand-painted and assembled on a sheet of, for example, paper with a background picture printed on it. Thus, if the buyer had checked a delivery schedule of one drawing every third week, the drawings consisting of the hand-painted sketch on a transparent film 60 that is mounted on a paper sheet 62 having the multi-colored background printed on it, is delivered to the buyer according to this schedule. Preferably, the individual drawings are delivered in a folded, cardboard frame 80 such as illustrated in FIG. 11.

Figure 9:
FIG. 9 shows a colored printed background picture over which the transparent film shown in FIG. 8 is placed.
Figure 10:
FIG. 10 shows the first hand sketch (FIG. 7A) and last sketch (7N) on the transparent film illustrated in FIG. 8 hand painted and assembled with the printed background picture shown in FIG. 9 to overlie the background picture.

As a bonus, the buyer may be given as the very last drawing one that shows the entire series of sketches 61 through 77 on a single transparent film 60, with individual sketches superimposed on each other as shown in FIG. 8 and spaced apart so that one could see the subject growing and moving over a wide, broad background area. FIG. 9 shows a printed background sheet 82 over which the transparent film 60 shown in FIG. 8 overlies. Only the first and last hand sketches 61 and 77, respectively, of the subject are painted. This allows the buyer to easily see how the subject grows and transitions and moves into different postures and positions relative to the picture on the background sheet 82 as it grows and then jumps to catch the Frisbee 78.

Figure 11:
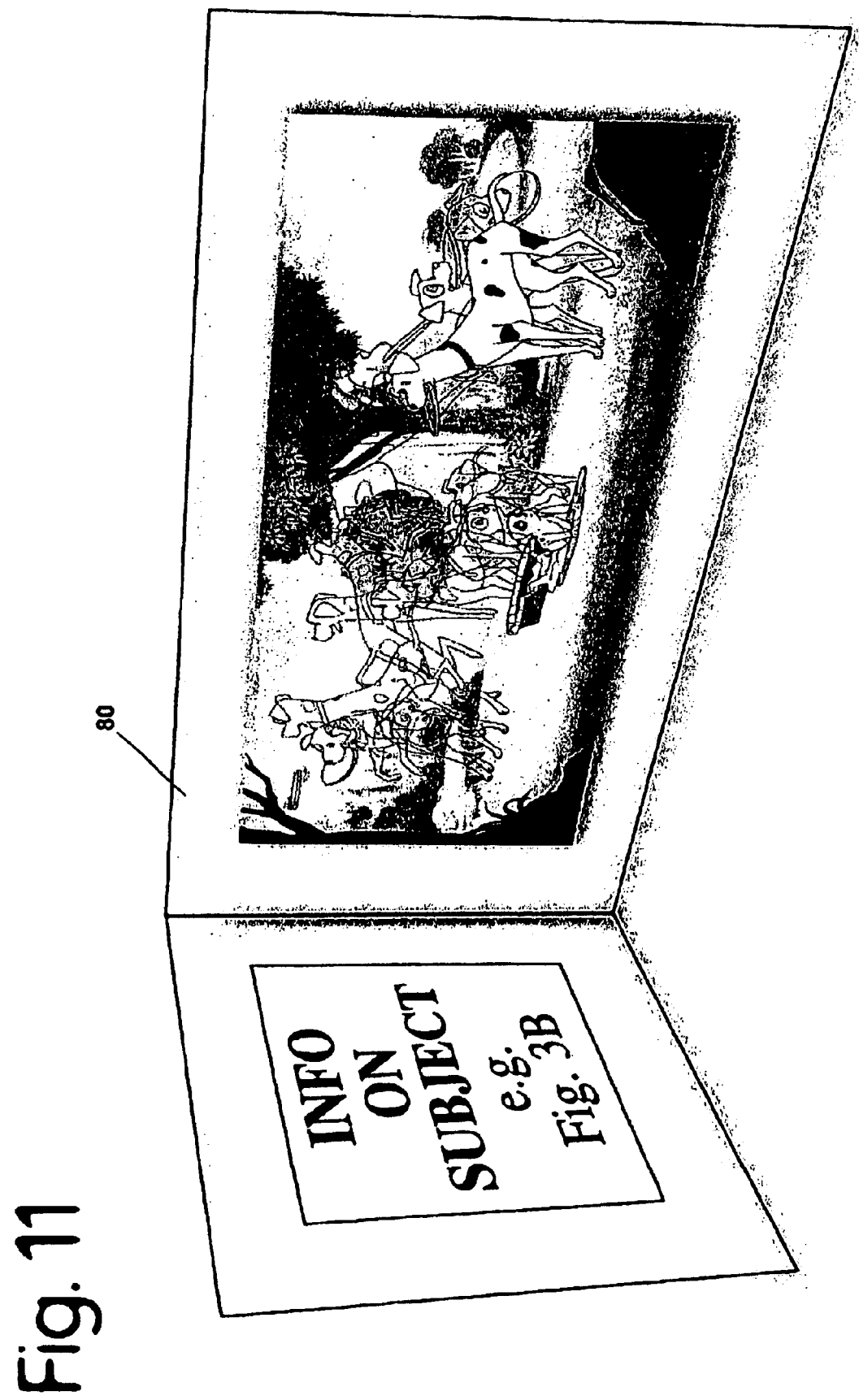
FIG. 11 is a display frame holding the assembled hand-painted transparent film and printed background picture mounted on the right-hand side of the frame and the Birth Certificate shown in FIG. 3B mounted on the left side of this card.
Figure 12:
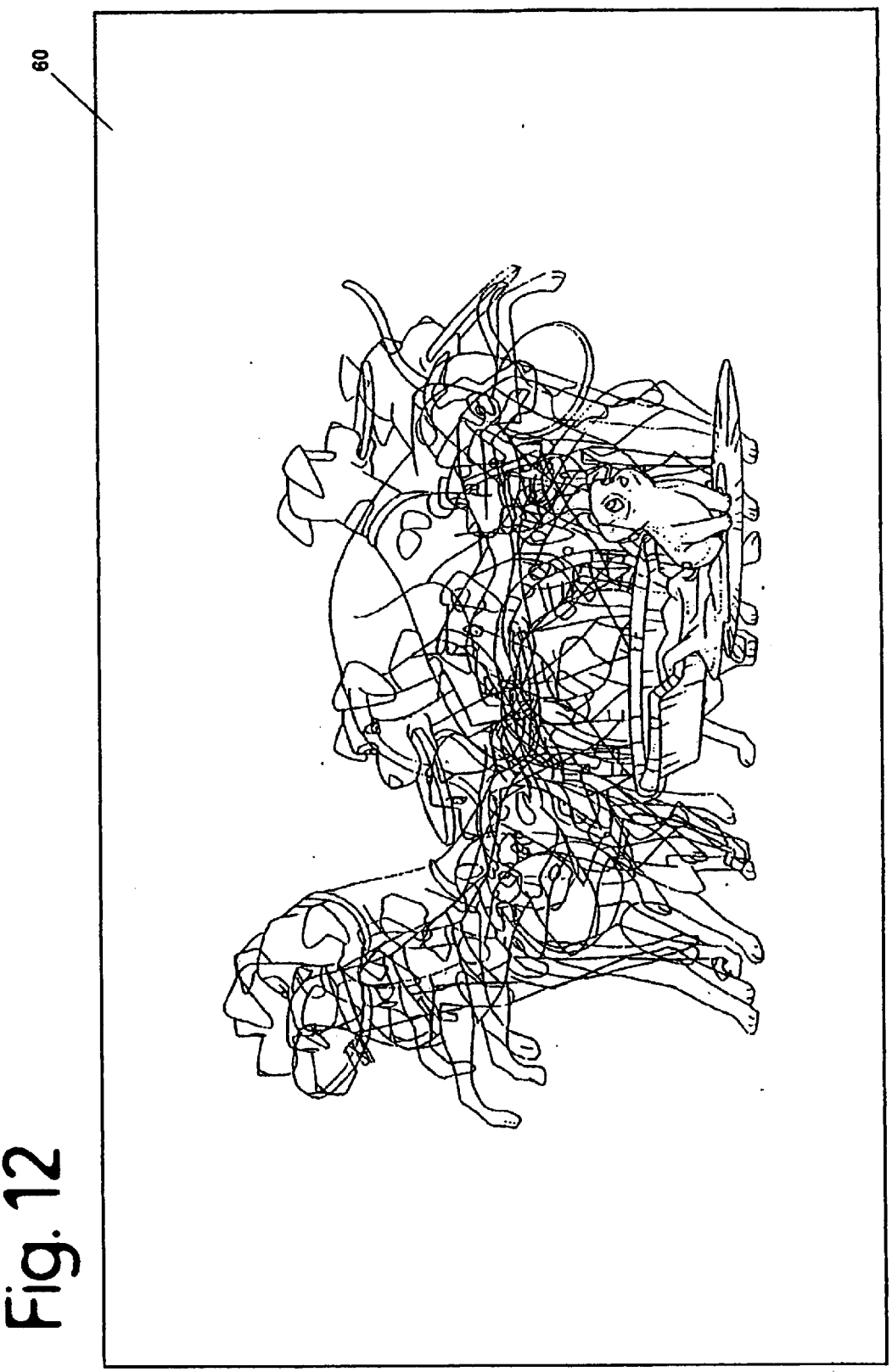
FIG. 12 shows a transparent film with the individual line drawings or hand sketches of the dog shown in FIGS. 7A through 7N superimposed on each other, but spaced much closer together than illustrated in FIG. 8 and the dog as a puppy (FIG. 7A) in the foreground.

FIG. 11 shows this bonus drawing mounted in on frame 80 on the right-hand side of the frame and the Birth Certificate, shown if FIG. 3B, mounted on the left side of the frame.

Figure 13:
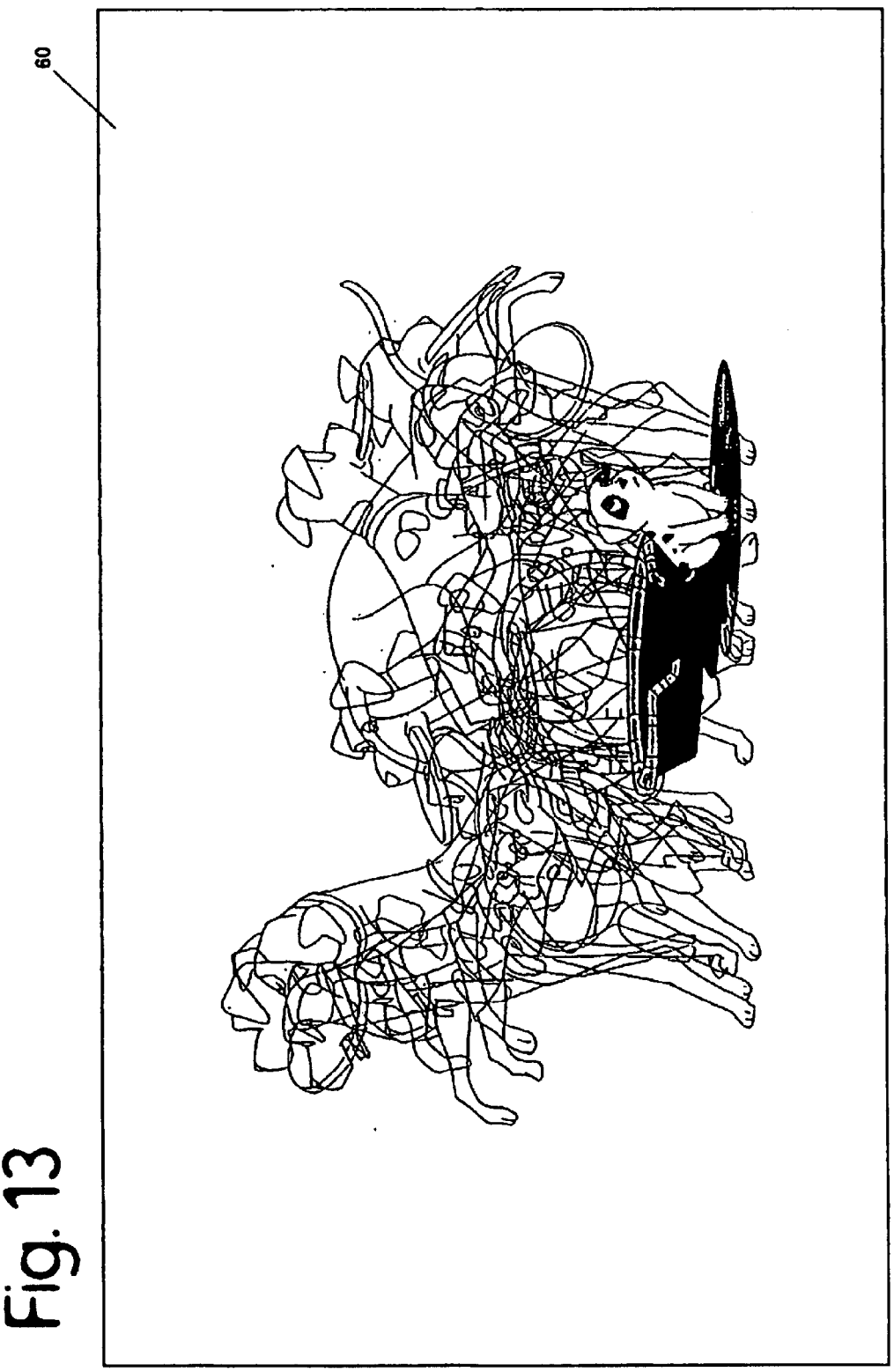
FIG. 13 is essentially the same as FIG. 12 except the backside is painted in the areas corresponding to the dog as a puppy (FIG. 7A) in the foreground.
Figure 14:
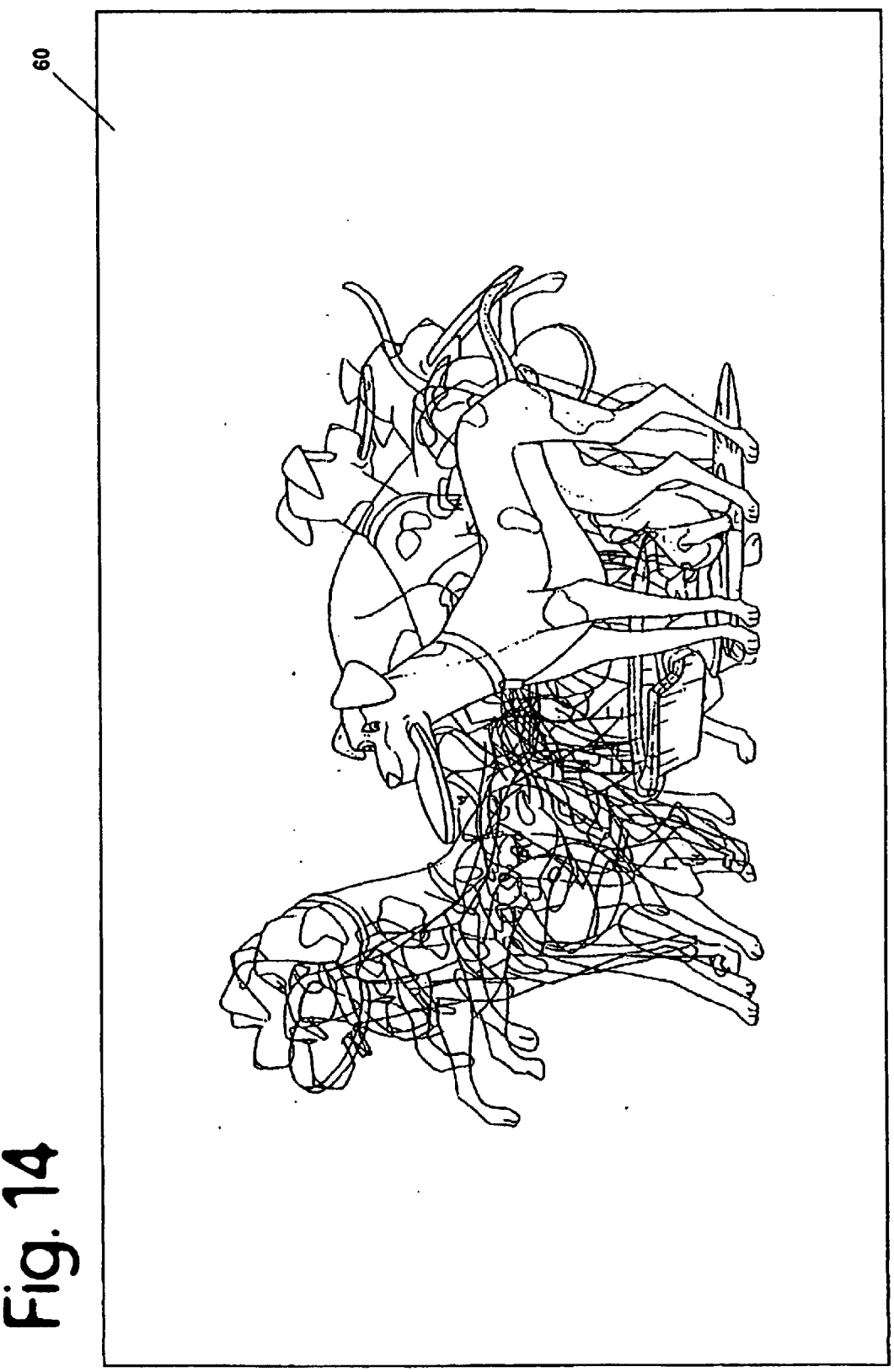
FIG. 14 shows a transparent film with the individual line drawings or hand sketches of the dog shown in FIGS. 7A through 7N superimposed on each other, but spaced much closer together than illustrated in FIG. 8 and the fully grown dog (FIG. 7N) in the foreground.
Figure 15:
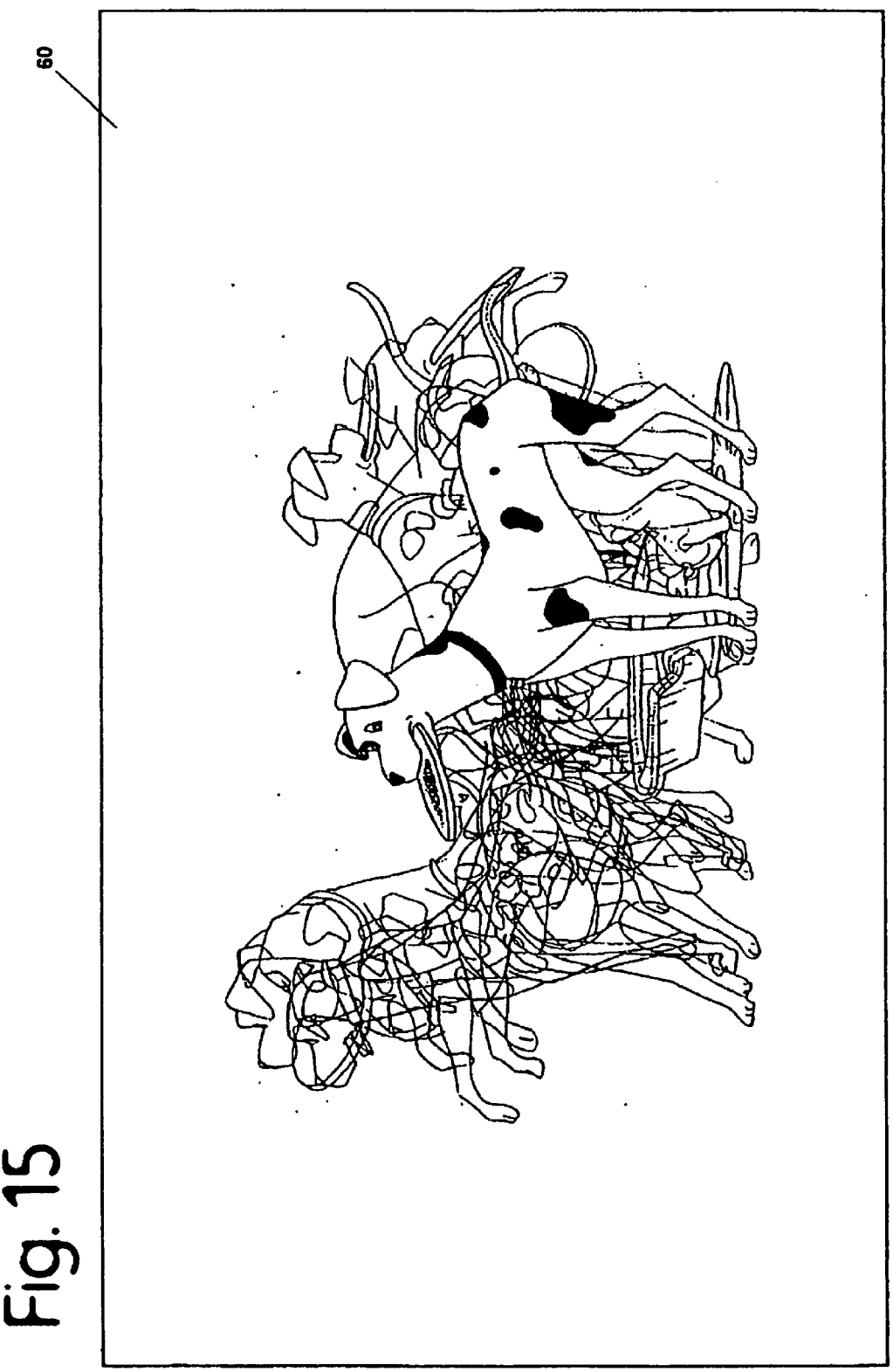
FIG. 15 is essentially the same as FIG. 14 except the backside is painted in the areas corresponding to the fully-grown dog (FIG. 7N) in the foreground.

FIGS. 12 and 13 and FIGS. 14 and 15 depict alternate ways of rendering a bonus drawing with the line sketches superimposed upon each other but more closely packed together. A different background sheet could be used in this situation such as the one shown in FIG. 6A. As illustrated in FIG. 13, the first hand-drawn line sketch in the series with the subject being a puppy is hand-painted according to conventional practice. In FIG. 14, the sketch with a dog in its fully grown stage and standing position with the Frisbee 78 in it's mouth is in the foreground and this is hand-painted as illustrated in FIG. 14. Again the transparent film 60 on bearing these superimposed sketches is placed on a suitable background sheet with a picture printed on its surface.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A method of distributing periodically individual drawings from a series of drawings that illustrate animation, comprising providing a web site connected to a global computer communication network, said web site displaying on a monitor screen a display for enabling a buyer (a) to select at least one subject from a plurality of different subjects for the drawings, the subjects of the drawing being cartoon characters, and comprising a series of individual drawings of the subject, with each drawing in the series being an original hand-painted work of art on a transparent film, said series of individual drawings being delivered in a predetermined sequence where, from one individual drawing to the next in the series, the subject changes in size or position so that, when the series of individual drawings are viewed rapidly one after the other in said sequence, the subject appears to change shaped or move in an animated manner, (b) to select a time interval at which individual drawings are delivered to the buyer, (c) to select a payment source, and (d) to provide a mailing address to which the drawings are sent, connecting to the web site and ordering a series of drawings by selecting the subject of the drawings, the time interval at which individual drawings are to be delivered, and the method of payment and providing a mailing address to which the drawings are sent, and delivering at said selected time interval the individual drawings.

2. The method of claim 1 where the web site includes an animated movie illustrating the type of drawings being offered.

3. The method of claim 1 including providing an individual drawing upon delivered in a folder that holds the individual drawing and provides information about the selected subject.

4. The method of claim 1 including providing a card indicating membership in a club promoting animation art.

5. The method of claim 1 where a printed background scene is provided over which the transparent film is placed.

\* \* \* \* \*